June 10, 1952     O. A. WIRKKALA     2,599,598
PROPELLER
Filed Jan. 13, 1950
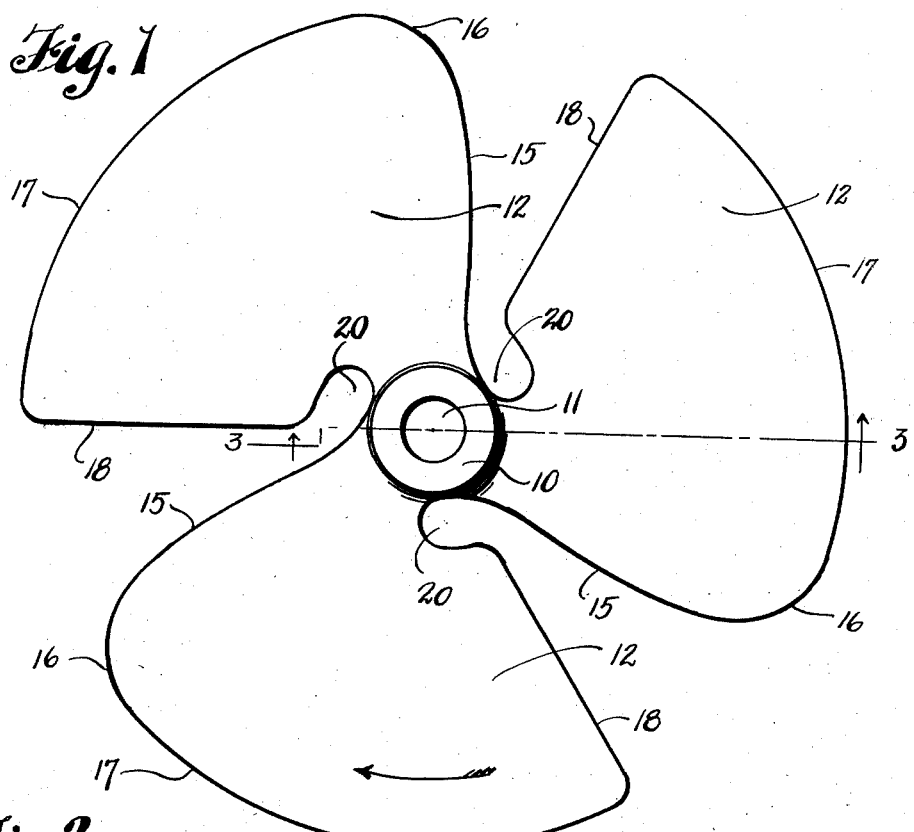
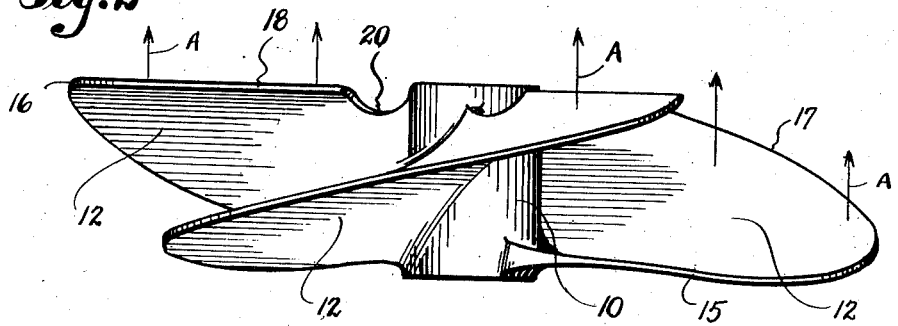
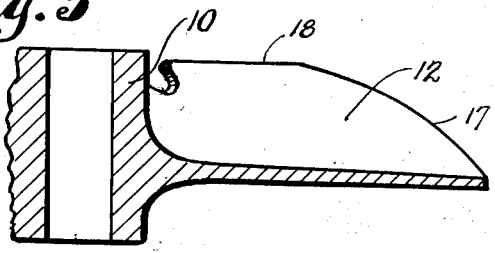
Inventor
OSCAR A. WIRKKALA
By
Cook & Robinson
Attorney Patented June 10, 1952

2,599,598

UNITED STATES PATENT OFFICE 2,599,598

PROPELLER

Oscar A. Wirkkala, Seattle, Wash., assignor to Wirkkala Propeller Sales, Inc.

Application January 13, 1950, Serial No. 138,290

1 Claim. (Cl. 170—159)

My invention relates to improvements in screw propellers for all types of marine vessels, producing increased operating efficiency. Its principal object is to provide a propeller that has advantages over the conventional screw propellers for all kinds of marine vessels, ships, boats and crafts and the motive power thereof, including outboard motors, and whether the motive power is generated by coal, gasoline, diesel oil, fuel oil, electricity or other means of generating power. The improvements hereinafter described are stated in comparison to currently conventional designs.

It is also an object of my invention to increase efficiency by providing a propeller design that will save fuel, reduce vibration and propeller noise and substantially eliminate vacuum pockets at the propeller which, except for such design, form while in operation.

The use of the specific form and design of the propeller blades, hereinafter more fully described, results in direct rearward push and substantial reduction of slippage. In accomplishing these and other advantages of this invention I have provided the improved details of construction which are illustrated in the accompanying drawings, wherein—

Fig. 1 is a rear end elevation of a propeller constructed according to this invention.

Fig. 2 is a side view of it.

Fig. 3 is a radial section of a blade of this propeller taken on line 3—3 in Fig. 1.

This illustration shows substantially the design and shape of the propeller which may vary in shape and size according to the vessel or service to which it may be applied, including outboard motors. The blades may be an integral part of the hub or attached to it by bolts or other means.

In this illustration 10 designates the central elongated hub of the propeller. This is formed with an axial bore 11 for mounting it on a shaft. The propeller blades are designated by reference 12 and may be an integral part or attached to the hub. The three or other number of blades are spaced at equal intervals about the hub. As herein shown, each extends through an arc of approximately 90° from forward to trailing edge leaving adequate clearance between its trailing edge and the forward edge of the next following blade.

Each blade has a forward or leading edge 15 curved outwardly on an arc from the hub portion and in a plane that is substantially perpendicular to one end portion of the hub. The rear edge 18, being the trailing edge of the blade, is straight and extends radially of the hub axis in a plane that is perpendicular, or approximately so, to the hub axis at the rear end of the hub. The trailing edge 18 and an inward portion thereof denoted by the dotted line 21, terminate inwardly at 22 and with an opposite or adjacent hub portion form the recesses 20.

Throughout its full extent the blade has uniform pitch. Because of its form, substantially all slippage in operation is eliminated and all propelling forces are caused to be directed straight back of the propeller as indicated by the arrows —A— in Fig. 2, thereby giving increased efficiency.

Among the other advantages obtained by this invention are those resulting from the specific form of the blades and their relationship to each other and to the propellers axial line.

By reason of the blades having their trailing edge 18 radially directed in a plane perpendicular to the axis of rotation and other elements of design, undesirable noise and turbulence in the propellers wake is greatly reduced.

Another advantageous and desirable feature is the elimination of suction or vacuum in the rear of the propeller while it is in operation. This is accomplished by recessing the trailing edge of each blade at a point adjacent the hub as illustrated at 20 in Fig. 1. This recessing permits water and air to flow from the forward side of the blades to the rear. Otherwise a pocket is created with the forward travel and motion of the conventional propeller. Elimination of this pocket prevents suction and vacuum and so adds to the propellers efficiency.

The resulting decrease of slippage and vibration renders the propeller practically noiseless in operation and without following air bubbles and turbulent wake.

The propelling forces being so directed straight backwards and the retarding suction being released, the propeller thereby achieves greater efficiency.

Propellers of this kind may be made in various sizes and with two or more blades which may be an integral part of the hub or fixed to the latter by bolts or other means and used on conventionally designed marine craft of all kinds and outboard motors.

It will be noted that the major portion of the leading edge 15 of each of the blades is in a plane substantially perpendicular to one end portion of the hub, and this leading edge merges into an outer peripheral edge 17 which is disposed on an arc circularly about the hub axis. The peripheral edge 17 terminates or merges into a substantially straight trailing edge 18, and this trailing edge is substantially in alignment with the other end portion of the hub and spaced from and opposite the leading edge. The substantially straight trailing edge 18 terminates in spaced relation to the hub and thus a space is created between the terminus of the straight trailing edge and the hub, which space is actually recess 20 that provides suction relief means between the hub and the straight trailing edge of each blade.

Having thus described my invention, what I claim as new therein and desire to secure by Letters Patent, is:

A marine propeller comprising a central elongated hub having opposite end portions and a plurality of substantially identical and individual equidistantly spaced curved blades extending radially outwardly therefrom, the major portion of the leading edge being in a plane substantially perpendicular to the hub axis at one end portion of the hub and merging into an outer peripheral edge disposed on an arc circularly about the hub axis, each blade having a trailing edge that is straight through a major portion and substantially in alignment with the other end portion of the hub and spaced from and opposite the leading edge, said trailing edge being recessed adjacent said hub, said recess forming suction relief means between the hub and the trailing edge of each blade.

OSCAR A. WIRKKALA.

REFERENCES CITED

The following references are of record in the file of this patent:

UNITED STATES PATENTS

| Number | Name | Date |
|---|---|---|
| Re. 16,387 | Carter | July 20, 1926 |
| 995,562 | Plewes | June 20, 1911 |
| 1,546,554 | Ross | July 21, 1925 |
| 2,134,921 | Kelleweay | Nov. 1, 1938 |
| 2,328,072 | Hans | Aug. 31, 1943 |
| 2,390,804 | McLean | Dec. 11, 1945 |

FOREIGN PATENTS

| Number | Country | Date |
|---|---|---|
| 114 | Great Britain | 1861 |
| 369,564 | France | Nov. 16, 1906 |
| 466,535 | France | Mar. 5, 1914 |